Figure 1:
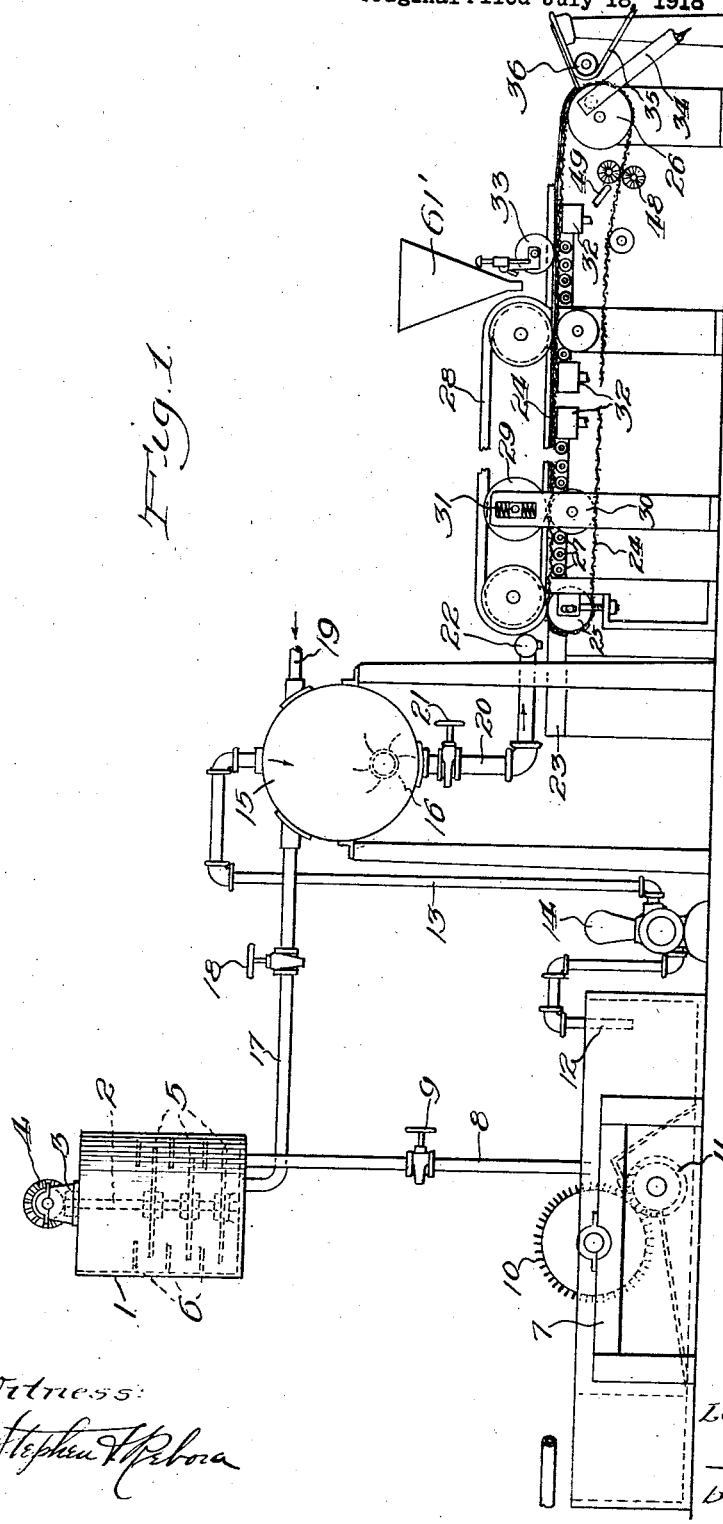

June 5, 1928.

L. KIRSCHBRAUN 1,672,262

FELTED FIBROUS WATERPROOF SHEET

Original Filed July 18, 1918    3 Sheets-Sheet 1

Witness:
Stephen V. Ribora

Inventor:
Lester Kirschbraun
by Frank L. Belknap
Atty

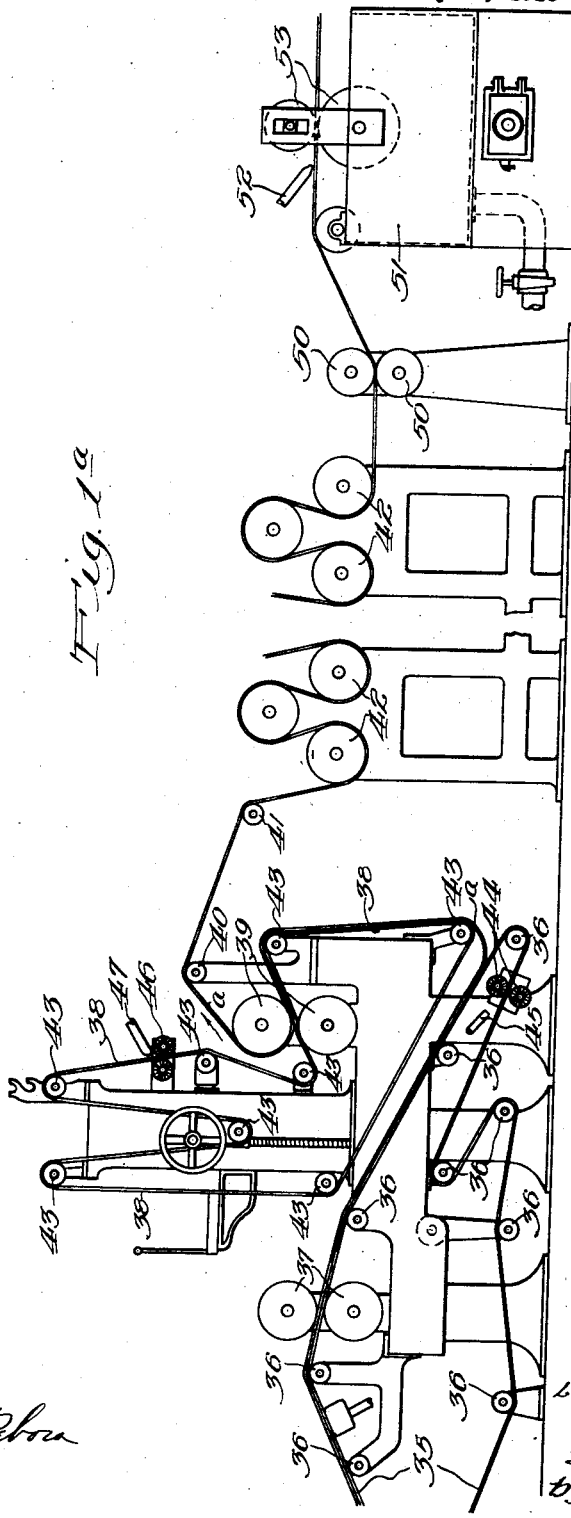

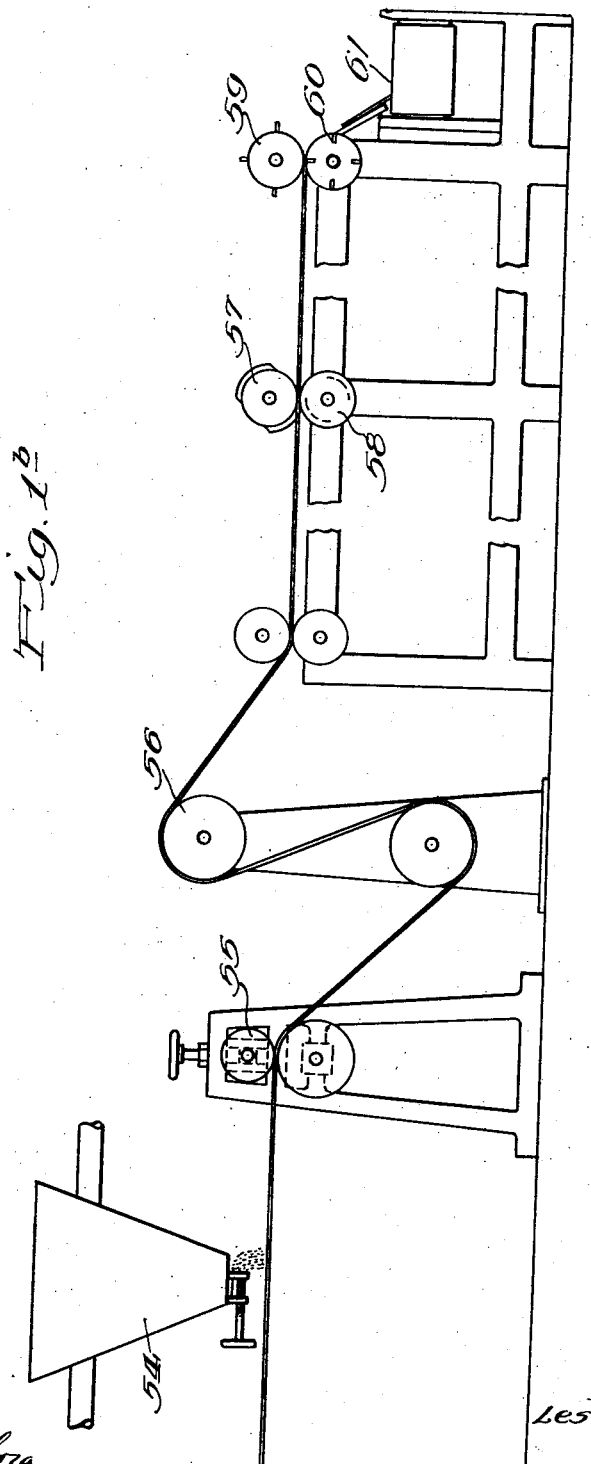

Patented June 5, 1928.

1,672,262

UNITED STATES PATENT OFFICE.

LESTER KIRSCHBRAUN, OF CHICAGO, ILLINOIS.

FELTED FIBROUS WATERPROOF SHEET.

Original application filed July 18, 1918, Serial No. 245,470. Divided and this application filed December 30, 1924. Serial No. 758,819.

This application is a division of Serial No. 245,470 filed July 18th, 1918.

This invention relates to improvements in felted fibrous waterproof sheets, and has among its salient objects to provide a felted or sheeted waterproof product used as roofing or covering of various kinds, and which consists essentially of a mixture of fibre, a normally adhesive bituminous binder, and an emulsifying agent formed into a tough, solid dry body; to provide a product which obviates the necessity of using as a base prepared felt, such as is used in the manufacture of asphalt shingles and similar elements; to provide a product which may have a wide range as to its flexibility, rigidity, weight and toughness, and in which a substantial body portion thereof can be made from relatively cheap or waste material; to provide a product of the character referred to in which a substantial portion of the materials thereof may be made of such waste products as sand, sawdust, clay and the like; to provide a product of the character referred to having the characteristics of being produced by the process in which the mixture may be fed in an aqueous vehicle or medium continuously to a felting or sheet-forming apparatus, and there formed into a sheet and pressed, coated, dried and cut into any desired shape or size, all as a continuous operation, and in general to provide certain other improvements of the character referred to.

In the drawings, Figs. 1, 1ª and 1ᵇ taken together indicate conventionally and diagrammatically a paper-making machine equipped with instrumentalities for practicing the herein-described process.

Referring to the drawings, 1 designates an emulsifier adapted to receive asphalt, or other bituminous binder, liquefied by heat, an emulsifying agent such as clay and water, and by proper agitation to emulsify the asphalt in the water. The emulsifier comprises a tank of any suitable construction, which is shown as provided with a rotating shaft 2, driven through gears 3 and 4 from any source of power. The shaft 2 carries a series of agitator arms 5 cooperating with stationary arms 6 secured to the side of the tank.

In preparing the emulsion, clay of a colloidal character is put in the emulsifier which has previously been charged with hot water, the proportions being such that a thick paste of doughy or viscous consistency is produced. Asphalt or other bituminous or pitchy binder, while liquefied by heat, is then slowly stirred into the paste, and water is gradually added from time to time to maintain the viscous working consistency. The added water is preferably warm or hot so as to keep the mass substantially at the approximate melting point of the asphalt. The agitation of these several ingredients disperses the asphalt in a very fine state of division throughout the aqueous medium containing the emulsifying agent. It is to be understood that emulsifying agents other than clay may be employed, provided an emulsion is produced, which is not of such sticky or adhesive character as to cause it to adhere to the paper-making instrumentalities.

This batch contained in the emulsifier can be delivered to a beater 7 through pipe 8 controlled by valve 9. The beater 7 is of any construction adapted for converting fibrous stock into pulp, and is shown as provided with a suitable beating roll or rolls 10 and 11.

The pulp which I use may be made from any suitable fibrous material such as paper waste, tan bark, wood pulp, cotton waste, grassy fibres and hemp. After the fibre is beaten to a pulp, the pulp is delivered by means of pipes 12 and 13 and pump 14 to a stuff chest 15. This chest 15 is provided with a mechanical agitator 16 driven from any suitable source of power. The emulsion instead of being delivered to the beater 7 may be delivered direct to the stuff chest through pipe 17 controlled by valve 18; if the emulsion is delivered directly to the beater, it is thoroughly beaten into thorough admixture with the fibrous stock, and if it is delivered directly to the stock chest, it is there mixed with the stock in such a way as to thoroughly incorporate it with the latter. It will be desirable in many cases to add a filler to the mixture which may be of such relatively cheap materials as saw dust, ground cork or any suitable comminuted material. It may be desirable to add more clay to the stuff chest also. The mixture in the chest 15 is thinned to the desired consistency by adding as much water as desired through the pipe 19.

The mixture should be sufficiently diluted with water to permit the stock to flow freely and the fibers to felt with each other, as is usual in the formation of a paper sheet. The various materials should be so mixed that the resulting stock shall be free of any tendency to be sticky or adhere to the machine. It may be here noted that when the emulsified composition is formed, the particles of the asphaltic or bituminous binder should be so thoroughly and finely dispersed through the aqueous paste that the particles of the binder will be effectually separated from each other, and surrounded by the clay and water. The operator may ascertain that the emulsification has been sufficient by manual manipulation. If properly emulsified, it will have a smooth, soapy feeling and be free from any tendency to exhibit adhesiveness.

By the use of the term "emulsion of a non-adhesive character" I refer to a composition having the characteristics hereinbefore referred to. The exact nature and character of emulsions is not entirely settled and various opinions have been expressed regarding the theory of emulsification. According to the present invention the asphalt, or analogous pitchy material, while in a melted fluid or semi-liquid condition, is dispersed in very fine particles throughout the aqueous vehicle so that the minute particles of asphalt are separated from each other and held out of contact with one another. As the expression has been used in the arts, the asphalt may be said to constitute the internal phase, and the water the external phase.

In any event, the composition, or matrix, as I may term it, is non-adhesive and, for example, can be readily washed off the hands, or off machinery with water. However, when the water is evaporated or removed, the particles of asphalt again revert to their adhesive and sticky condition. While it is true that the asphalt may be solid or semi-solid at ordinary atmospheric temperatures, it is in a heated fluid or semi-liquid condition while being emulsified and resumes its normal solid or semi-solid consistency when the matrix is cold, without apparently altering the dispersion of the asphalt particles so long as contained in the aqueous vehicle. It is to be noted that this matrix is of such a character that when it is mixed with the fibrous stock and formed into a sheet, the asphalt undergoes no change in character or constitution through the use of chemicals or other reagents.

After the bituminous stock is thoroughly mixed, it is delivered to the sheet forming mechanism through pipe 20 controlled by valve 21. The delivery end of the pipe 20 is provided with outlet 22 which is preferably the width of the sheet desired. The outlet 22 delivers the mixture to a flow box 23 from which it overflows onto an endless traveling screen or Fourdrinier wire 24, which is trained around rollers 25 and 26. Intermediate idler rollers may be provided as desired. The upper lap of the screen travels across table rollers 27. At either side the screen is provided with confining belts or deckles 28, as is usual. A dandy roll 29 may be yieldingly mounted as at 31, and below it is shown a supporting roll 30.

As shown in Fig. 1, the apparatus is broken away to reduce the size of the drawings, although the endless screen or wire is of sufficient length to allow the desired amounts to drain through the screen. To facilitate the removal of the water from the sheet, I have shown the usual suction boxes 32 and intermediate pressure rolls 33, an additional suction pipe 34 being provided to remove water, if desired.

In forming, the sheet passes over the foraminated wire or screen onto a fabric felt 35, which is trained around a series of rolls 36 and driven from any suitable source of power. Presser rolls 37 may also be provided. The newly formed sheet $a$ is threaded up over the felt 38 to press rolls 39 and thence up over guide rolls 40 and 41 to a series of drying rolls 42. The felt 38 serves to take up any surplus moisture and returns over rolls 43.

The felt 35 may be cleaned by means of rotating brushes 44 and suitable showers 45. The felt 38 can also be cleaned by brushes 46 and showers 47, and the screen by brushes 48 and showers 49. It will be understood however, that one of the important features of the present invention is that the mixture which is to be sheeted is of such character that it can be readily washed off of the various felts and will not stick thereto.

After the now formed and dried sheet leaves the rolls 42 it passes through calender rolls 50 to the coating mechanism 51, which is provided with delivery pipe 52 for the coating material, such as is employed in the manufacture of prepared roofing, and presser rollers 53 which may be of any suitable construction. If granular faced roofing is being formed, the coated sheet can be fed beneath hopper 54 containing suitable granular material so as to cover the face of the roofing. The sheet then coated and covered with granular material is passed between pressure rolls 55 and thence over cooling rolls 56 to slitting knives 57 carried by roll 58. The sheet which is now severed longitudinally may be cut transversely to form shingles or shingle strips by passing through transverse knives 59 carried by rollers 60. It is to be understood of course, that these knives and rolls are so geared, as to operate synchronously. The shingles or shingle strips are then carried away by traveling conveyor belt 61.

The apparatus here shown is adapted for making shingles or shingle strips of prepared roofing such as asphalt shingles, and the like, but it is to be understood that the sheet after having been formed may be treated in any desired manner, such for example, as having a design printed thereon, etc., for use as flooring.

It may be desirable in certain instances to put a granular facing over the sheet and dispense with the coating. This may be done by impressing granular material on the sheet through the hopper 61' while the sheet is still in sufficiently plastic condition to permit the granular or powdered material to become partially embedded in and adhere to the sheet. In other cases it may be desirable to give a color or luster to the roofing and this can be accomplished by covering the granular facing of the roofing after it is applied with a film of silicate of soda and a pigment or dye, the pigment or dye giving the desired color.

By the term "bituminous" applied to the binder I mean to include those natural and artificial asphalts or other residual products of petroleum, coal tar pitch, or other pitches and analogous fusible pitchy or resinous substances, which are normally adhesive or of such an adhesive character that they will not normally in an aqueous medium pass over a paper-forming machine without sticking thereto unless they are converted to a non-adhesive state.

In order to more readily practice the invention the following proportions of ingredients have been found satisfactory in the manufacture of fully saturated roofing felt. To 33 parts dry weight of fibrous stock is added an emulsion composed of 55 parts by weight of asphalt emulsified with 12 parts by weight of colloidal clay contained in an aqueous vehicle. It will be understood that these proportions will vary depending upon the nature of the stock and the degree of saturation with asphalt desired in the finished sheet. Of course, during the sheet-forming operation the particles of binder will be distributed among and deposited on the fibres in the sheet during the felting of the same.

I claim as my invention:

1. A felted water-resistant sheet comprising fibrous material having an asphalt binder coating the fibres in the form of a substantially continuous film, said film containing a dispersing agent, said sheet possessing the characteristics of having its fibres felted in the presence of the binder particles.

2. A felted water-resistant sheet comprising fibrous material having a fusible waterproof pitchy binder coating the fibres in the form of a substantially continuous film containing a dispersing agent, said sheet possessing the characteristics of having its fibres felted in the presence of the binder particles.

3. A felted water-resistant sheet comprising fibrous material having an asphalt binder coating the fibres in the form of a substantially continuous film, a non-fluid filler and a dispersing agent contained in said film, said sheet possessing the characteristics of having its fibres felted in the presence of the binder particles.

4. A felted water-resistant sheet comprising fibrous material, and an asphaltic waterproof binder coating the fibres in the form of a substantially continuous film containing a clay-like dispersing agent, said sheet possessing the characteristics of having its fibres felted in the presence of the binder particles.

5. A felted water-resistant sheet comprising fibrous material having a pitchy binder coating the fibres in the form of a substantially continuous film, and a clay-like dispersing agent, said sheet possessing the chracteristics of having its fibres felted in the presence of the binder.

6. A water-resistant sheet comprising a felted fibre coated with an asphalt binder extending throughout the sheet in the form of substantially continuous films, said sheet possessing the characteristics of having its fibres felted in the presence of the binder.

7. A water-resistant sheet comprising felted fibres coated with a non-liquid waterproof pitch extending throughout the sheet in the form of substantially continuous films, a non-fibrous filler, and a dispersing agent contained in said film, said sheet possessing the characteristics of having its fibres felted in the presence of the pitch particles.

LESTER KIRSCHBRAUN.